United States Patent [19]
Földes née Berezsnich et al.

[11] Patent Number: 5,126,415
[45] Date of Patent: Jun. 30, 1992

[54] PROCESS FOR PRODUCING POLYMERS WITH A POLYDISPERSITY OPTIONALLY APPROACHING THE THEROTETICAL ONE AND SUBSTITUTED BY FUNCTIONAL GROUPS IN $\alpha$, $\omega$-POSITIONS, BY RADICAL POLYMERIZATION

[75] Inventors: Tamara Földes née Berezsnich, Budapest; Györgyi Mikéta née Fenyvesi, Salgótarján; András Nagy, Budapest; Tibor Pernecker, Budapest; Árpád Rehák, Budapest; Dániel Szalay, Budapest; Ferenc Tüdos, Budapest, all of Hungary

[73] Assignee: MTA Kozponti Kemiai Kutato Intezete, Budapest, Hungary

[21] Appl. No.: 523,252

[22] Filed: May 11, 1990

Related U.S. Application Data

[63] Continuation of Ser. No. 116,871, Nov. 5, 1987, abandoned.

[30] Foreign Application Priority Data

Nov. 14, 1986 [HU] Hungary ............................... 4693/86

[51] Int. Cl.$^5$ ............................. C08F 4/04; C08F 4/28
[52] U.S. Cl. ...................................... 526/73; 526/59; 526/61; 526/212; 526/329.1; 526/338; 526/335; 526/346
[58] Field of Search ............................. 526/59, 61, 73

[56] References Cited

U.S. PATENT DOCUMENTS

| | | | |
|---|---|---|---|
| 3,726,846 | 4/1973 | Squire et al. | 526/73 |
| 3,726,848 | 4/1973 | Squire et al. | 526/73 |
| 3,817,965 | 6/1974 | Mace et al. | 526/73 |
| 4,079,074 | 3/1978 | Sanchez et al. | 526/73 |
| 4,125,695 | 11/1978 | Kamath . | |
| 4,125,696 | 11/1978 | Kamath | 526/73 |
| 4,746,715 | 5/1988 | Dworczak et al. | 526/211 |

FOREIGN PATENT DOCUMENTS 2757427 7/1978 Fed. Rep. of Germany ........ 526/73

OTHER PUBLICATIONS

Reed, Journal of Polymer Science, Polymer Chemistry Edition, vol. 19, 1863–1866 (1981).
Ghatgl et al., Journal of Polymer Science, Polymer Chemistry Edition, vol. 2, 3591–3595 (1983).

*Primary Examiner*—Edward J. Smith
*Attorney, Agent, or Firm*—Keil & Weinkauf

[57] ABSTRACT

The invention relates to a process for preparing polymers, with a polydispersity optionally approaching the theoretical polydispersity and substituted by functional groups in $\alpha,\omega$-positions, via radical polymerization of radically polymerizable monomers and using one or more initiators. In compliance with this process the degree of polymerization is maintained at the desired value by continuous elevation of the temperature.

In case of a given heat program, the process of the invention renders possible to increase the conversion in producing polymers without the deterioration of the polydispersity.

4 Claims, No Drawings

PROCESS FOR PRODUCING POLYMERS WITH A POLYDISPERSITY OPTIONALLY APPROACHING THE THERORETICAL ONE AND SUBSTITUTED BY FUNCTIONAL GROUPS IN α, ω-POSITIONS, BY RADICAL POLYMERIZATION

This application is a continuation of application Ser. No. 116,871, filed on Nov. 5, 1987, now abandoned.

This invention relates to a process for preparing polymers, with polydispersity optionally approaching the theoretical polydispersity and with functional groups in α,ω-positions, by radical polymerization of radically polymerizable monomers, using one or more initiators.

Radical polymerization for making polymers disubstituted by functional groups in α,ω-positions is performed according to the known methods by polymerizing the polymerization solution containing monomer or monomers, initiator and solvent at a given temperature for a given period of time. The functionality of the polymer formed is determined in each case by the incorporated initiating radicals carrying the functional group.

When hydrogen peroxide is used as initiator, as, for example in the process disclosed in the U.S. Pat. No. 3,338,861, the functionality exceeds the desired value of 2.0 owing to the fact that the hydroxyl radical formed from hydrogen peroxide is highly reactive at the applied temperature (118°–120° C.). A further disadvantage of the process is the very high dispersity: $\overline{M}_w/\overline{M}_n = 2.5$ to 3.5, where $\overline{M}_n$ denotes the number average molecular mass and $\overline{M}_w$ denotes the weight average molecular mass.

When 4,4'-azo-bis(4-cyano-n-pentanol) (ACP) is used as initiator, the functionality is lower than 2.0 and the polydispersity ($\overline{M}_w/\overline{M}_n$) reaches the desired value of 1.5–1.6 only in the case of low conversion (28–30%) [(Reed, S.: Pol. Sci., Part A1, 9, 2029–2038 (1971)].

The best method known so far to maintain polydispersity at a constant level is given by British patent specification No. 957,652. The essence of this method is that the amount of initiator decomposed during polymerization is supplemented by continuous addition, but only a nearly constant polydispersity can be achieved this way. A disadvantage of this process is that the monomer consumption during polymerization is not compensated. Although this could be theoretically realized by the extension of the basic principle of the procedure to the application of monomer supply, the use of increased excess of monomer considerably decreases the reactor capacity (polymer production per unit time in each reactor), on the one hand, and the increasing costs of recovering the larger quantity of unreacted monomer increase the production expenditures, on the other hand. A further disadvantage of the process is the very high specific use of initiator.

In radical polymerization, it is a difficult task to assure sufficient polydispersity. It is partly due to decrease in initiator concentration during the reaction involving the deceleration of the radical producing process, that is, the rate of initiation gradually decreases. The other reason is the decrease in monomer concentration. The simultaneous decrease in concentration of the monomer (to smaller extent) and of the initiator (to higher extent) causes an increase in the degree of polymerization together with that in polydispersity.

The aim of the present invention is, by the elimination of the disadvantages of known solutions, to create a process which makes possible to produce polymers with optimal degree of polymerization and with polydispersity optionally approaching the theroretical polydispersity, by radical homo- and copolymerization.

The invention is based on the recognition that the above aim can completely be achieved if the desired degree of polymerization is maintained on a practically constant value by raising the temperature according to a suitable program.

The invention is based furthermore on the recognition that the regulation of the degree of polymerization by raising the temperature can practically be realized by simulating the polymerization process using either an analytical formula or a computer and by conducting the real polymerization process according to the heat program obtained from simulation.

Accordingly, the invention relates to a process for preparing polymers with polydispersity optionally approaching the theoretical polydispersity and substituted by functional groups in α,ω-positions, via radical polymerization of radically polymerizable monomers, using one or more initiators. In the method of the present invention, the polymerization degree is maintained at the desired value by continuous elevation of the temperature.

According to a preferred practical realization of the process of the invention, the polymerization degree is regulated by the continuous elevation of the temperature in such a way that the polymerization process is conducted according to a heat program determined by a function describing the variation of polymerization process against time with the aid of independent variables affecting the process, suitably the initiator concentration, monomer concentration, initial temperature, heating up time, desired degree of polymerization and polydispersity, as well as the Arrhenius parameters of the decomposition rate constant(s) of initiator(s) and those of the chain propagation and termination rate constants characteristic of the monomer.

According to another preferable practical realization of the process of the invention, the polymerization degree is regulated by the continuous elevation of the temperature in such a way that the polymerization process is simulated by an analytical formula or by a computer and the actual polymerization process is conducted according to the heat program obtained by the simulation procedure.

Computer simulation is suitably realized in practice by putting into the computer the initial data, suitably the concentrations of initiator and monomer, the initial temperature, the heating up time, the desired polymerization degree and polydispersity as well as the Arrhenius parameters of decomposition rate constant(s) of initiator(s) and those of the chain propagation and termination rate constants characteristic of the monomer, then the temporal variation of polymerization degree is followed by the continuous change of the polymerization temperature in function of polymerization time, suitably in the order of magnitude of seconds, analytically or using the computer, and the heat program required to compensate the change in the degree of polymerization is calculated.

In case of deviation from the desired polymerization degree, the computer, by varying temperature or the polymerization time, chooses and sets into the polymerization system such temperature values which make the polymerization degree again to reach the necessary value. Thus, a set of discrete temperature-time pairs is obtained, which is called discontinuous temperature program. By decreasing the distance between the individual points, i.e. by refining the polymerization time belonging to each temperature value, the continuous temperature program is reached, which has the feature that at any point (at any temperature) the polymerizing degree is equal to the desired value. Thus, still before starting the process, a heat program derived by iterational determination of polymerization degree is obtained which, having conducted the polymerization according to it, furnishes the product of the desired molecular weight and polydispersity.

For the experimental realization of the heat program—as it was outlined above—the Arrhenius equation(s) of decomposition rate constant(s) ($k_1$) of initiator(s) as well as the Arrhenius equation of the quotient ($k_2/\sqrt{k_4}$) of the rate constants of chain propagation ($k_2$) and of chain termination ($k_4$) characteristic of the monomer(s) must be known. These relationships can easily be determined from the methods and data given in the books of Bagdasaryan or of Bamford [Bagdasaryan, B. S.: Theory of Radical Polymerization, Publishing House of the Hungarian Academy of Sciences, Budapest, 1961 (in Hungarian); Bamford, C. H.: Comprehensive Chemical Kinetics Vol. 14a, Elsevier, 1976].

As it is known, the lower limiting value of polydispersity in radical polymerization is:

in case of termination exclusively by recombination: $\overline{P}_w/\overline{P}_n = 1+\alpha/2 \cong 1.5$, functionality = 2.0;

in case of termination exclusively by disproportionation: $\overline{P}_w/\overline{P}_n = 1+\alpha \cong 2$, functionality = 1.0 and $$\alpha = \frac{1}{1 + \frac{k_4 r}{k_2 m}} \tag{1}$$

where m is the monomer concentration, $\alpha$ is the probability of chain propagation, $r = \sqrt{W_1/k_4}$ = the steady state concentration of the propagating macroracidals, $W_1$ is the rate of initiation, $\overline{P}_w$ is the weight average degree of polymerization, $\overline{P}_n$ is the number average degree of polymerization.

For certain systems the chain termination is mixed, thus the theoretical value of polydispersity is between 1.5 and 2.0, that of functionality is between 2.0 and 1.0 if there is no chain transfer to the monomer. This latter has an undesirable effect on the above value (increases polydispersity and decreases functionality). It is to be noted that the value of polydispersity can be further decreased by certain methods (fractionation, selective precipitation, etc.) but the application of these methods usually inadmissibly increases the production costs.

At a constant temperature the polydispersity continuously increases during the process. The temperature must be elevated in such a way what the quotient $\kappa = k_4 r / k_2 m = \sqrt{(2k_1 f \times k_4)}/k_2 m$ should assume the $\kappa \cong$ const. value at any moment. Considering the Arrhenius relationships, this condition can be brought to the following form:

$$\kappa = \sqrt{2f} \frac{\sqrt{A_1 A_4}}{A_2} \frac{\sqrt{x(t)}}{m(t)} \exp\left(-\frac{\Delta E}{RT(t)}\right) \tag{2}$$

where $\Delta E = \frac{1}{2}(E_1 + E_4) - E_2$, and it value is 37.5 to 75 kJ/mole for various monomers, m(t) is the momentary concentration of the monomer, x(t) is the momentary concentration of the initiator, $A_1$, $A_2$ and $A_4$ are the preexponential factors of the corresponding Arrhenius equations, T(t) is the heat program, f is the radical efficiency factor.

The "quality" of the choice of heat program applied to a given polymerization process, i.e. that of conducting the process can be controlled as follows:

at the moment t=0, we obtain from Eq. (2):

$$f(0) = \frac{\sqrt{x(0)}}{m(0)} \exp\left(-\frac{\Delta E}{RT(0)}\right); \tag{3}$$

at the moment t=t:

$$f(t) = \frac{\sqrt{x(t)}}{m(t)} \exp\left(-\frac{\Delta E}{RT(t)}\right) \tag{4}$$

The quality factor of the experimental regime can be composed from Equs. (3) and (4):

$$Q = \frac{f(0)}{f(t)} \tag{5}$$

The closer is Q to unity, the better is the heat program, and the program is still sufficient if Q is an element of the following open interval:

$$0.75 < Q < 1.12 \tag{6}$$

If in the process according to the invention a mixture of hydrogen peroxide and an azo-initiator (for example: ACP) or azoinitiators is used to initiate the polymerization process, then—in case the polymerization process is conducted according to the corresponding heat program—the sufficient polydispersity and funcitonality of the product can be ensured. Thus, for example, in the production of polybutadienediol, the number average molecular mass of the product is $\overline{M}_n = 2500-4000$. The polydispersity of the product is 1.5–1.6, the functionality is near 2.0.

The process according to the invention makes possible to prepare $\alpha,\omega$-disubstituted polymers of polydispersity optionally approaching the theoretical polydispersity and functionality from, e.g., butadiene and other conjugated dienes, radically, polymerizable vinyl monomers, acrylic and methacrylic esters, acrylo- and methacrylonitrile. Using the process, the main chain of the polymer formed from butadiene contains mainly monomer units incorporated in 1,4-position, i.e. the 1,4-cis- +1,4-trans-content is higher than 80%.

The polymer prepared like this contains reactive end-groups in $\alpha,\omega$-positions, for example in the case of polybutadienediol (HTPBD) —OH-groups, which enable the polymer to undergo further chemical reactions. Thus, for example, from polymer diols polyurethane can be produced with tolylene-diisocyanate and a cross-linking agent.

The main advantages of the process according to the invention are the following:

1. In case of a given heat program, the conversion can be optimally increased without deterioration of the polydispersity ($\overline{P}_w/\overline{P}_n$).

2. By suitable choice of the heat program and of the initial concentrations, optimal degree of polymerization can be obtained in the case of optimal composition.

3. It does not require surplus initiator as compared to that required in usual radical polymerization processes, and it makes possible the almost total using up of the initiator (contrary to the process given in British patent specification No. 957,652).

4. The practical execution of the heat program does not require auxiliary equipment or usage of surplus materials (see ibid).

5. It can be carried out on a technological course already working. It can be easily automated, without major transformation of a technological equipment already in work.

The process of the invention is illustrated in detail by the following examples, without limiting the scope claimed.

EXAMPLE 1

In a Parr autoclave of 1 liter volume, 160 g of HTPBD prepolymer were prepared as follows: 4.045 g (0.018 mole/l) of ACP and 10 ml of 67 mass % (0.227 mole/l) $H_2O_2$ were dissolved in 400 ml of sec-butanol. After deoxygenation 290.35 g (6.188 mole/l) of butadiene were introduced. After filling, the pressure in the reactor was 186 kPa. The process was conducted according to the following heat program:

| Temperature (°C.) | Reaction time (min) | Quality factor |
|---|---|---|
| 70 | 0 | 1.0024 |
| 70.8 | 17.3 | 1.0043 |
| 71.6 | 21.8 | 1.0047 |
| 73.6 | 30.1 | 1.0032 |
| 74.8 | 34.3 | 1.0035 |
| 76.2 | 38.5 | 1.0045 |
| 77.8 | 42.6 | 1.0087 |
| 79.8 | 46.8 | 1.0127 |
| 82.4 | 51 | 1.0152 |
| 85.6 | 55.1 | 1.0188 |
| 89.0 | 59.3 | 1.0176 |
| 91.4 | 63.5 | 1.0156 |
| 92.8 | 67.6 | 1.0006 |
| 93.4 | 71.8 | 1.0027 |
| 93.6 | 77 | 1.0002 |
| 93.8 | 82.5 | 1.0002 |
| 94.0 | 97 | 1.0002 |
| 94.2 | 112.5 | 1.0002 |
| 94.4 | 127.6 | 1.0002 |
| 94.8 | 157 | 1.0001 |
| 95.0 | 171.1 | 1 |
| 95.2 | 185 | 1.0006 |
| 95.4 | 198.8 | 1.0003 |
| 95.6 | 212 | 1.0007 |
| 95.8 | 225.1 | 1.0001 |
| 96.0 | 237.6 | 1.0003 |
| 96.2 | 250.1 | 1.0003 |
| 96.4 | 262.3 | 1.0001 |
| 96.6 | 274.1 | 1.0006 |
| 96.8 | 286 | 1.0009 |
| 97.0 | 297.5 | 1 |
| 97.2 | 308.3 | 1.0007 |
| 97.4 | 319.5 | 1.0002 |
| 97.6 | 330 | 1.0004 |
| 97.8 | 340.5 | 1.0002 |
| 98.0 | 350.6 | 1.0008 |
| 98.2 | 360.8 | 1.0009 |
| 98.4 | 370.6 | 1.0007 |
| 98.6 | 380.1 | 1 |
| 98.8 | 389.3 | 1 |
| 99.0 | 398.5 | 1.0007 |
| 99.2 | 407.6 | 1.0009 |
| 99.4 | 416.5 | 1.0006 |
| 99.6 | 425 | 1.001 |
| 99.8 | 433.5 | 1.0007 |
| 100.0 | 441.6 | 1.001 |
| 100.2 | 449.8 | 1.001 |
| 100.4 | 457.6 | 1.0002 |
| 100.6 | 465.1 | 1 |
| 100.8 | 472.6 | 1.0005 |
| 101.0 | 480.1 | 1.0003 |
| 101.2 | 487.3 | 1.0007 |
| 101.4 | 494.5 | 1.0003 |
| 101.6 | 501.3 | 1.0006 |
| 101.8 | 508.1 | 1 |

At the end of the process the pressure was 1000 kPa. After blowing off, 160 g of polybutadienediol were obtained. $\overline{M}_n = 3500$, functionality: 1.97; $\overline{M}_w/\overline{M}_n = 1.56$.

EXAMPLE 2

In a Parr autoclave of 1 liter volume, 159.16 g of butadiene-styrene copolymer were prepared as follows: 4.074 g (0.018 mole/l) of ACP and 10 ml of 55 mass % (0.223 mole/l) $H_2O_2$ were dissolved in 400 ml of sec-butanol, then 83 ml (75.13 g) of styrene were added. After deoxygenation 226,6 g of butadiene were introduced. The copolymerization was conducted according to the following heat program:

| Temperature (°C.) | Reaction time (min) | Quality factor |
|---|---|---|
| 70 | 0 | 1.0091 |
| 71.0 | 20.3 | 1.0048 |
| 72.0 | 24.8 | 1.0051 |
| 73.0 | 29.3 | 1.0047 |
| 74.2 | 33.5 | 1.0029 |
| 75.6 | 37.6 | 1.0019 |
| 77.2 | 41.8 | 1.0048 |
| 79.2 | 46 | 1.0093 |
| 82.0 | 50.1 | 1.0121 |
| 85.8 | 54.3 | 1.0238 |
| 91.0 | 58.5 | 1.0304 |
| 94.8 | 62.6 | 1.0170 |
| 96.2 | 66.8 | 1.0035 |
| 96.6 | 71 | 1.0007 |
| 96.8 | 75.5 | 1.0001 |

At the end of the process, the pressure amounted to 580 kPa. The copolymer obtained had the following properties: $\overline{M}_n = 3460$; $\overline{M}_w/\overline{M}_n = 1.60$; functionality: 1.98. Molar ratio of styrene in this copolymer: 10.5%; from the 98.5% of butadiene incorporated, 83% had 1,4-structure and only 17% showed 1,2-structure.

EXAMPLE 3

In a Parr autoclave of 1 liter volume, 120 g of butadiene-methacrylate copolymer were synthesized. 4.074 g (0.018 mole/l) of ACP and 10 ml of 55 mass % (0.223 mole/l) $H_2O_2$ were dissolved in 400 ml of see butanol, then 47 ml of methyl methacrylate were added. After deoxygenation 262.62 g of butadiene were introduced. The copolymerization was conducted according to the following heat program:

| Temperature (°C.) | Reaction time (min) | Quality factor |
|---|---|---|
| 70 | 0 | 1.0004 |
| 70.8 | 19 | 1.0023 |
| 71.6 | 23.5 | 1.0027 |
| 72.6 | 27.6 | 1.0054 |
| 73.8 | 32.1 | 1.0002 |

-continued

| Temperature (°C) | Reaction time (min) | Quality factor |
|---|---|---|
| 75.0 | 36.3 | 1.0017 |
| 76.4 | 40.5 | 1.0040 |
| 78.0 | 44.6 | 1.0097 |
| 80.2 | 48.8 | 1.0091 |
| 82.8 | 53 | 1.0155 |
| 86.0 | 57.1 | 1.0216 |
| 89.4 | 61.3 | 1.0172 |
| 91.8 | 65.5 | 1.0054 |
| 93.0 | 69.6 | 1.0026 |
| 93.4 | 74.1 | 1.0008 |
| 93.6 | 78.3 | 1.0001 |
| 93.8 | 83.5 | 1.0002 |
| 94.0 | 97.3 | 1.0002 |
| 94.2 | 112.8 | 1.0002 |
| 94.4 | 128 | 1.0002 |
| 94.6 | 142.8 | 1.0002 |
| 94.8 | 157.3 | 1.0001 |
| 95.0 | 171.5 | 1.0000 |
| 95.2 | 185.3 | 1.0006 |
| 95.4 | 199.1 | 1.0003 |
| 95.6 | 212.3 | 1.0007 |
| 95.8 | 225.5 | 1.0001 |
| 96.0 | 238 | 1.0003 |
| 96.2 | 250.5 | 1.0003 |
| 96.4 | 262.6 | 1.0001 |
| 96.6 | 274.5 | 1.0006 |
| 96.8 | 286.3 | 1.0009 |
| 97.0 | 297.8 | 1.0009 |
| 97.2 | 309.0 | 1.0007 |
| 97.4 | 319.8 | 1.0001 |
| 97.6 | 330.3 | 1.0003 |
| 97.8 | 340.8 | 1.0002 |
| 98.0 | 351 | 1.0007 |
| 98.2 | 361.1 | 1.0009 |
| 98.4 | 371 | 1.0006 |
| 98.6 | 380.5 | 1.0011 |
| 98.8 | 390 | 1.0011 |
| 99.0 | 399.1 | 1.0006 |
| 99.2 | 408 | 1.0008 |
| 99.4 | 416.8 | 1.0005 |
| 99.6 | 425.3 | 1.0008 |
| 99.8 | 438.8 | 1.0006 |
| 100 | 442 | 1.0011 |
| 100.2 | 450.1 | 1.0009 |
| 100.4 | 458 | 1.0011 |
| 100.6 | 465.5 | 1.0013 |
| 100.8 | 473.3 | 1.0004 |
| 101 | 480.5 | 1.0002 |
| 101.2 | 487.6 | 1.0006 |
| 101.4 | 494.8 | 1.0002 |
| 101.6 | 501.6 | 1.0005 |
| 101.8 | 508.5 | 1.0015 |

The product obtained had the following properties: $\overline{M}_n = 3800$; $\overline{M}_w/\overline{M}_n = 1.50$; functionality: 2.01.

EXAMPLE 4

In a Parr autoclave of 1 liter volume, 163.4 g of butadiene-acrylonitrile copolymer were prepared as follows: 4.074 g (0.018 mole/l) of ACP and 10 ml of 55 mass % (0.223 mole/l) H$_2$O$_2$ were dissolved in 400 ml of sec. butanol, then 75 ml (60.88 g) of acrylonitrile monomer were added. After deoxygenation 224 g of butadiene gas were introduced into the reaction mixture. The copolymerization was conducted according to the following heat program:

| Temperature (°C) | Reaction time (min) | Quality factor |
|---|---|---|
| 70 | 0 | 1.0099 |
| 71.0 | 20 | 1.0004 |
| 71.8 | 24.1 | 1.0023 |
| 72.8 | 28.3 | 1.0009 |
| 73.8 | 32.5 | 1.0048 |
| 75.2 | 36.6 | 1.0012 |
| 76.6 | 40.8 | 1.0075 |
| 78.6 | 45 | 1.0065 |
| 81.0 | 49.1 | 1.0140 |
| 84.6 | 53.3 | 1.0183 |
| 89.6 | 57.5 | 1.0292 |
| 94.2 | 61.6 | 1.0206 |
| 96.2 | 65.8 | 1.0086 |
| 96.8 | 70.3 | 1.0001 |
| 97.0 | 76.1 | 1.0007 |
| 97.2 | 86.6 | 1.0004 |
| 97.4 | 97.5 | 1.0009 |
| 97.6 | 108.3 | 1.0001 |
| 97.8 | 118.5 | 1.0010 |
| 98.0 | 129 | 1.0004 |
| 98.2 | 138.8 | 1.0006 |
| 98.4 | 148.6 | 1.0004 |
| 98.6 | 158.1 | 1.0008 |
| 98.8 | 167.6 | 1.0008 |
| 99.0 | 176.8 | 1.0003 |
| 99.2 | 185.6 | 1.0005 |
| 99.4 | 194.5 | 1.0002 |
| 99.6 | 203 | 1.0006 |
| 99.8 | 211.5 | 1.0004 |
| 100.0 | 219.6 | 1.0008 |
| 100.2 | 227.8 | 1.0007 |
| 100.4 | 235.6 | 1.0012 |
| 100.6 | 243.5 | 1.0010 |
| 100.8 | 251 | 1.0001 |
| 101.0 | 258.1 | 1.0013 |
| 101.2 | 265.6 | 1.0003 |
| 101.4 | 272.5 | 1.0014 |
| 101.6 | 279.6 | 1.0002 |
| 101.8 | 286.1 | 1.0012 |

At the end the process the pressure amounted to 855 kPa. The copolymer obtained had the following properties: $\overline{M}_n = 4000$; $\overline{M}_w/\overline{M}_n = 1.56$; functionality: 2.03.

EXAMPLE 5

In a Parr reactor of 1 liter volume, 150 g of butadiene-methyl methacrylate copolymer were synthesized as follows: 4.037 g (0.018 mole/l) of ACP and 10 ml of 55 mass % (0.223 mole/l) H$_2$O$_2$ were dissolved in 400 ml of sec. butanol, then 80 ml (75 g) of methyl methacrylate were added to the initiator solution. After deoxygenation 225 g of butadiene were added. The polymerization was conducted according to the following heat program:

| Temperature (°C) | Reaction time (min) | Quality factor |
|---|---|---|
| 70 | 0 | 1.0069 |
| 71.0 | 20 | 1.0019 |
| 71.8 | 24.5 | 1.0035 |
| 72.8 | 28.6 | 1.0017 |
| 73.8 | 32.8 | 1.0050 |
| 75.0 | 37 | 1.0072 |
| 76.6 | 41.1 | 1.0041 |
| 78.4 | 45.3 | 1.0070 |
| 80.6 | 49.5 | 1.0138 |
| 83.6 | 53.6 | 1.0192 |
| 87.6 | 57.8 | 1.0214 |
| 91.4 | 62 | 1.0204 |
| 93.6 | 66.1 | 1.0113 |
| 94.6 | 70.3 | 1.0013 |
| 95.0 | 70.3 | 1.0113 |
| 95.2 | 83.3 | 1.0004 |
| 95.4 | 96.8 | 1.0001 |
| 95.6 | 110 | 1.0005 |
| 95.8 | 123.1 | 1.0000 |
| 96.0 | 135.6 | 1.0001 |
| 96.2 | 148.1 | 1.0001 |
| 96.4 | 160.3 | 1.0008 |
| 96.6 | 172.5 | 1.0004 |
| 96.8 | 184 | 1.0007 |
| 97.0 | 195.5 | 1.0007 |
| 97.2 | 206.6 | 1.0005 |

| Temperature (°C) | Reaction time (min) | Quality factor |
|---|---|---|
| 97.4 | 217.5 | 1.0000 |
| 97.6 | 228 | 1.0002 |
| 97.8 | 238.5 | 1.0000 |
| 98.0 | 248.6 | 1.0005 |
| 98.2 | 258.8 | 1.0007 |
| 98.4 | 268.6 | 1.0005 |
| 08.6 | 278.1 | 1.0009 |
| 98.8 | 287.6 | 1.0009 |
| 99.0 | 296.8 | 1.0004 |
| 99.2 | 305.6 | 1.0006 |
| 99.4 | 314.5 | 1.0003 |
| 99.6 | 323 | 1.0007 |
| 99.8 | 331.5 | 1.0005 |
| 100 | 339.6 | 1.0009 |
| 100.2 | 347.8 | 1.0008 |
| 100.4 | 355.6 | 1.001 |
| 100.6 | 363.5 | 1.0011 |
| 100.8 | 371 | 1.0002 |
| 101.0 | 378.1 | 1.0000 |
| 101.2 | 385.3 | 1.0004 |
| 101.4 | 392.5 | 1.0000 |
| 101.6 | 399.3 | 1.0003 |
| 101.8 | 406.1 | 1.0013 |

At the end of the process the pressure was 930 kPa. The polymer obtained had the following properties: $\overline{M}_n = 3700$; $\overline{M}_w/\overline{M}_n = 1.65$; functionality: 1.93.

EXAMPLE 6

In a Parr reactor of 1 liter volume, 90 g of polystyrenediol copolymer were synthesized as follows: 3.326 g (0.015 mole/l) of ACP and 14.96 g (0.5 mole/l) of $H_2O_2$ were dissolved in 660 ml of benzene, then 183 g of styrene were added. The polymerization was conducted according to the following heat program:

| Temperature (°C) | Reaction time (min) | Quality factor |
|---|---|---|
| 60 | 0 | 1.0528 |
| 60.4 | 27.6 | 1.0500 |
| 60.6 | 33.5 | 1.0505 |
| 60.8 | 38 | 1.0511 |
| 61.2 | 46.6 | 1.0506 |
| 61.4 | 50.8 | 1.0507 |
| 61.6 | 55 | 1.0511 |
| 62.0 | 59.1 | 1.0501 |
| 62.2 | 64.6 | 1.0512 |
| 62.6 | 68.8 | 1.0517 |
| 63.0 | 74.3 | 1.0510 |
| 63.4 | 79.5 | 1.0512 |
| 63.8 | 84.6 | 1.0502 |
| 64.2 | 89.5 | 1.0501 |
| 64.6 | 94.3 | 1.0510 |
| 65.0 | 99.1 | 1.0505 |
| 65.4 | 103 | 1.0508 |
| 65.8 | 108.1 | 1.0521 |
| 66.2 | 112.6 | 1.0517 |
| 66.6 | 116.8 | 1.0523 |
| 67.2 | 121 | 1.0521 |
| 67.8 | 125.8 | 1.0503 |
| 68.4 | 130.3 | 1.0505 |
| 69.0 | 134.8 | 1.0527 |
| 69.6 | 139.3 | 1.0529 |
| 70.4 | 143.5 | 1.0518 |
| 71.2 | 152.5 | 1.0542 |
| 72.0 | 152.5 | 1.0542 |
| 73.0 | 156.6 | 1.0560 |
| 74.0 | 161.1 | 1.0559 |
| 75.2 | 165.3 | 1.0525 |
| 76.4 | 1169.5 | 1.0548 |
| 77.8 | 173.6 | 1.0547 |
| 79.2 | 177.8 | 1.0603 |
| 80.8 | 182 | 1.0610 |
| 82.4 | 186.1 | 1.0621 |
| 84.0 | 190.3 | 1.0562 |
| 85.2 | 194.5 | 1.0592 |
| 86.2 | 198.6 | 1.0552 |
| 87.0 | 202.8 | 1.0509 |
| 87.4 | 207.3 | 1.0512 |
| 87.8 | 211.5 | 1.0517 |
| 88.0 | 217.3 | 1.0501 |
| 88.2 | 223.8 | 1.0502 |
| 88.4 | 247.6 | 1.0501 |
| 88.6 | 276.5 | 1.0500 |
| 88.8 | 304.6 | 1.0503 |
| 89.0 | 332.5 | 1.0501 |
| 89.2 | 359.3 | 1.0502 |
| 89.4 | 385.8 | 1.0502 |

The polymer obtained had the following properties: $\overline{M}_n = 10,590$; $\overline{M}_w/\overline{M}_n = 1.59$; functionality: 1.96.

EXAMPLE 7

In a Parr autoclave of 1 liter volume, 104 g of polybutadienediol holopolymer was prepared as follows: 4.302 g (0.020 mole/l) of ACP and 8.9 ml of 76.2 mass % (0.238 mole/l) $H_2O_2$ were dissolved in 400 ml of sec. butanol. After deoxygenation 260.5 g of butadiene gas were introduced. The polymerization was conducted according to the following heat program:

| Temperature (°C) | Reaction time (min) | Quality factor |
|---|---|---|
| 70 | 0 | 0.7524 |
| 70.8 | 10 | 0.7507 |
| 71.6 | 14.1 | 0.7515 |
| 72.6 | 18.3 | 0.7543 |
| 73.8 | 22.8 | 0.7513 |
| 75.0 | 27 | 0.7537 |
| 76.6 | 31.1 | 0.7526 |
| 78.4 | 35.3 | 0.7567 |
| 80.8 | 39.5 | 0.7611 |
| 84.4 | 43.6 | 0.7636 |
| 89.6 | 47.8 | 0.7708 |
| 94.4 | 52 | 0.7682 |
| 96.4 | 56.1 | 0.7565 |
| 97.0 | 60.3 | 0.751 |
| 97.2 | 64.8 | 0.75 |
| 97.4 | 71.6 | 0.7505 |
| 97.6 | 82.5 | 0.7506 |
| 97.8 | 93 | 0.7505 |
| 98.0 | 103.1 | 0.7501 |
| 98.2 | 113 | 0.7502 |
| 98.4 | 122.8 | 0.75 |
| 98.6 | 132.3 | 0.7503 |
| 98.8 | 141.8 | 0.7504 |
| 99.0 | 151 | 0.75 |
| 99.2 | 159.8 | 0.7501 |
| 99.4 | 168.6 | 0.7508 |
| 99.6 | 177.5 | 0.7502 |
| 99.8 | 185.6 | 0.75 |
| 100.0 | 193.8 | 0.7504 |
| 100.2 | 202 | 0.7502 |
| 100.4 | 209.8 | 0.7506 |
| 100.6 | 217.6 | 0.7505 |
| 100.8 | 225.1 | 0.7509 |
| 101.0 | 232.6 | 0.7607 |
| 101.2 | 239.8 | 0.751 |
| 101.4 | 247 | 0.7507 |
| 101.6 | 253.8 | 0.7509 |
| 101.8 | 260.6 | 0.7505 |

The polymer obtained had the following characteristics: $\overline{M}_n = 4000$; $\overline{M}_w/\overline{M}_n = 2.33$; functionality: 2.07. The increased polydispersity proves that the considerable deviation of quality factor from the value 1.00 results in the increase of the quotient $\overline{M}_w/\overline{M}_n$.

EXAMPLE 8

In a Parr reactor of 1 liter volume, 127 g of polybutadienediol were synthesized as follows: 3.97 g (0.018 mole/l) of ACP and 8.9 ml of 75 mass % (0.248 mole/l) H$_2$O$_2$ were dissolved in 4000 ml of sec. butanol. After deoxygenation 280 g of butadiene gas were introduced. The polymerization was conducted according to the following heat program:

| Temperature (°C.) | Reaction time (min) | Quality factor |
| --- | --- | --- |
| 70 | 0 | 1.2732 |
| 71.2 | 21.6 | 1.2502 |
| 72.0 | 25.8 | 1.2517 |
| 73.0 | 30 | 1.2561 |
| 74.2 | 34.5 | 1.2587 |
| 75.6 | 39 | 1.2515 |
| 77.0 | 43.1 | 1.2547 |
| 78.6 | 47.3 | 1.2601 |
| 80.6 | 51.5 | 1.2654 |
| 85.2 | 59.8 | 1.2653 |
| 87.4 | 64 | 1.2601 |
| 89.0 | 68.1 | 1.2537 |
| 90.0 | 72.3 | 1.2555 |
| 90.6 | 76.8 | 1.2542 |
| 90.8 | 82 | 1.2503 |
| 91.0 | 86.1 | 1.2502 |
| 91.2 | 97.3 | 1.2503 |
| 91.4 | 118.5 | 1.2606 |
| 91.6 | 139.3 | 1.2504 |
| 91.8 | 159.5 | 1.2504 |
| 92.0 | 179.3 | 1.25 |
| 92.2 | 198.5 | 1.2505 |
| 92.4 | 217.6 | 1.2505 |
| 92.6 | 236.1 | 1.2506 |
| 92.8 | 254.3 | 1.2501 |
| 93.0 | 271.8 | 1.2505 |
| 93.2 | 289.3 | 1.2502 |
| 93.4 | 306.1 | 1.25 |
| 93.6 | 322.6 | 1.2508 |
| 93.8 | 339.1 | 1.2507 |
| 94.0 | 355 | 1.2507 |
| 94.2 | 370.5 | 1.2507 |
| 94.4 | 385.6 | 1.2507 |
| 94.6 | 400.5 | 1.2506 |
| 94.8 | 415 | 1.2506 |
| 95.0 | 429.1 | 1.2504 |
| 95.2 | 443 | 1.2501 |
| 95.4 | 456.5 | 1.2508 |
| 95.6 | 470 | 1.2503 |
| 95.8 | 482.8 | 1.2506 |
| 96.0 | 495.6 | 1.2508 |
| 96.2 | 508.1 | 1.2508 |
| 96.4 | 520.3 | 1.2506 |
| 96.6 | 532.1 | 1.25 |
| 96.8 | 543.6 | 1.2504 |
| 97.0 | 555.1 | 1.2505 |
| 97.2 | 566.3 | 1.2502 |
| 97.4 | 577.1 | 1.2508 |
| 97.6 | 588 | 1.251 |
| 97.8 | 598.5 | 1.2508 |
| 98.0 | 608.6 | 1.2501 |
| 98.2 | 618.5 | 1.2503 |
| 98.4 | 628.3 | 1.25 |
| 98.6 | 637.8 | 1.2506 |
| 98.8 | 647.3 | 1.2506 |
| 99.0 | 656.5 | 1.25 |
| 99.2 | 665.3 | 1.2503 |
| 99.4 | 674.1 | 1.2514 |
| 99.6 | 683 | 1.2503 |
| 99.8 | 691.1 | 1.21 |
| 100 | 699.3 | 1.2506 |
| 100.2 | 707.5 | 1.2504 |
| 100.4 | 715.3 | 1.251 |
| 100.6 | 723.1 | 1.2508 |
| 100.8 | 730.6 | 1.2515 |
| 101.0 | 738.1 | 1.2511 |
| 101.2 | 745.3 | 1.2517 |
| 101.4 | 752.5 | 1.2512 |
| 101.6 | 759.3 | 1.2516 |
| 101.8 | 766.1 | 1.2508 |

The polymer obtained had the following characteristics: $\overline{M}_n = 3700$; $\overline{M} = 2.02$; functionality: 2.06. The considerable deviation of polydispersity from the theoretical value indicates the undesired effect of increase of the quality factor.

We claim:

1. A process for preparing homo- or copolymers substituted by functional groups in $\alpha,\omega$-positions and having a polydispersity of from 1.50 to 1.65, by the radical homo- or copolymerization of radically polymerizable monomer or monomers in the presence of one or more initiators consisting essentially of initiators which initiate the formation of polymers with functional groups in the alpha, omega positions of the azo and peroxide types, which comprises starting the polymerization process at an initial temperature determined by the polymerization degree to be attained and by the chemical nature and concentration of the monomer(s) and initiator(s) and during the polymerization process raising the temperature T(t) according to the following heat program:

$$f(t) = \frac{\sqrt{x(t)}}{m(t)} \exp\left(-\frac{\Delta E}{RT(t)}\right)$$

such that $$\frac{f(t=o)}{f(t)} = Q \text{ and } 1.0000 < Q < 1.0621$$

wherein
X is the initiator concentration, m is the monomer concentration, $\Delta E$ is the overall activation energy characterizing the process R is the universal gas constant and Q is a quality factor.

2. The process of claim 1 for the regulation of polymerization degree by continuous elevation of the temperature, in which the polymerization process is simulated by an analytical formula or by a computer, and the actual polymerization process is conducted according to the heat program obtained by the simulation procedure.

3. The process of claim 2 for the practical realization of computer simulation, in which the initial data are put into the computer, then the temporal variation of polymerization degree is followed via the continuous change of polymerization temperature in function of polymerization time by the computer, and the heat program required to compensate the change in the degree of polymerization is calculated.

4. The process of claim 3, in which the concentrations of initiator and of monomer, the initial temperature, the heating up time, the desired degree of polymerization and polydispersity as well as the Arrhenius parameters of decomposition rate constant(s) of initiator(s) and those of the chain propagation and termination rate constants characteristic of the monomer are used as initial data.

* * * * *